(12) United States Patent
Perreault et al.

(10) Patent No.: US 7,889,519 B2
(45) Date of Patent: Feb. 15, 2011

(54) METHODS AND APPARATUS FOR A RESONANT CONVERTER

(75) Inventors: David J. Perreault, Brookline, MA (US); Juan M. Rivas, Auburndale, MA (US); Anthony D. Sagneri, Cambridge, MA (US); Olivia Leitermann, Arlington, MA (US); Yehui Han, Cambridge, MA (US); Robert C. N. Pilawa-Podgurski, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 616 days.

(21) Appl. No.: 11/622,571

(22) Filed: Jan. 12, 2007

(65) Prior Publication Data

US 2007/0171680 A1      Jul. 26, 2007

Related U.S. Application Data

(60) Provisional application No. 60/758,583, filed on Jan. 12, 2006.

(51) Int. Cl.
    *H02M 3/335* (2006.01)
(52) U.S. Cl. ................ 363/21.02; 363/39; 363/40; 323/222; 323/282; 323/351
(58) Field of Classification Search ......... 363/21.02, 363/39, 40; 323/222, 282, 351
See application file for complete search history.

(56) References Cited

U.S. PATENT DOCUMENTS

| | | | | |
|---|---|---|---|---|
| 3,461,372 A | * | 8/1969 | Pickup et al. | 363/40 |
| 4,605,999 A | * | 8/1986 | Bowman et al. | 363/19 |
| 4,685,041 A | * | 8/1987 | Bowman et al. | 363/40 |
| 4,720,667 A | * | 1/1988 | Lee et al. | 323/271 |
| 4,720,668 A | * | 1/1988 | Lee et al. | 323/271 |
| 4,814,962 A | * | 3/1989 | Magalhaes et al. | 363/16 |
| 4,841,220 A | * | 6/1989 | Tabisz et al. | 323/282 |
| 4,857,822 A | * | 8/1989 | Tabisz et al. | 323/282 |
| 4,891,746 A | * | 1/1990 | Bowman et al. | 363/131 |
| 5,067,066 A | * | 11/1991 | Chida | 363/16 |

(Continued)

FOREIGN PATENT DOCUMENTS

GB      2 389 973 A      12/2003

OTHER PUBLICATIONS

Young-Jin Woo, Sang-Kyung Kim and Gyu-Hyeong Cho, Voltage-Clamped Class-E Inverter With Harmonic Tuning Network for Magnetron Drive, IEEE Transactions on Industrial Electronics, vol. 53, No. 12, Dec. 2006, pp. 1456-1460.

(Continued)

*Primary Examiner*—Patrick J Assouad
*Assistant Examiner*—Manuel Hernandez
(74) *Attorney, Agent, or Firm*—Daly, Crowley, Mofford & Durkee, LLP

(57) ABSTRACT

Methods and apparatus for a dc-dc converter for operating at substantially fixed switching frequency, the converter including a rectifier, and a resonant inverter coupled to the rectifier, the resonant inverter including a switch and a reactive network having first, second, third and fourth energy storage elements, wherein an impedance magnitude at the output of the switch due to the reactive network has minima at dc and at a frequency near a second harmonic of the switching frequency.

25 Claims, 12 Drawing Sheets

U.S. PATENT DOCUMENTS

| | | | | |
|---|---|---|---|---|
| 5,300,895 | A | * | 4/1994 | Jones .......................... 330/251 |
| 5,317,494 | A | * | 5/1994 | Noro ............................ 363/18 |
| 5,772,057 | A | | 6/1998 | Finneran |
| 6,101,102 | A | | 8/2000 | Brand et al. |
| 2003/0107413 | A1 | * | 6/2003 | Bennett ...................... 327/108 |
| 2006/0250826 | A1 | * | 11/2006 | Remson ................... 363/21.06 |

OTHER PUBLICATIONS

Zbigniew Kaczmarczyk, High-Efficiency Class E, $EF_2$, and $E/F_3$ Inverters, IEEE Transactions on Industrial Electronics, vol. 53, No. 5, Oct. 2006, pp. 1584-1593.

Notification of transmittal of the International Search Report and the Written Opinion of the International Searching Authority, or the Declaration dated Oct. 19, 2007. (Form PCT/ISA/220).

Prodanovic M et al: "Power quality improvement in grid connection of three-phase inverters" Proceedings of the $14^{TH}$ International Symposium on Power Semiconductor Devices & ICS. ISPSD '02. Santa Fe, NM, Jun. 4-7, 2002, International Symposium on Power Semiconductor Devices & IC'S, New York, NY: pp. 24-29, XP010602877 ISBN: 0-7803-7318-9. Abstract figures 1-3 & 6.

Blaabjerg F et al: "Hybrid Compensation Arrangement in Dispersed Generation Systems" IEEE Transactions on Power Delivery, IEEE Service Center, New York, NY, US, vol. 20, No. 2, Apr. 2005, pp. 1719-1727, XP011129502 ISSN: 0885-8977. Abstract p. 1720, left-hand col. figures 2 & 3.

* cited by examiner

METHODS AND APPARATUS FOR A RESONANT CONVERTER

CROSS-REFERENCE TO RELATED APPLICATIONS

The present application claims the benefit of U.S. Provisional Patent Application No. 60/758,583, filed on Jan. 12, 2006, which is incorporated herein by reference.

STATEMENT REGARDING FEDERALLY SPONSORED RESEARCH

This invention was made with government support awarded by the National Science Foundation under Grant No. ECS-0401278 and the Air Force under Grant No. FA8650-05-C-7201. The government has certain rights in this invention.

BACKGROUND

As is known in the art, the demand for ever smaller and more capable electronic devices drives power electronics research. Greater integration, a flood of portable devices, and continued trends in computation and communication are placing increasing demands on the size, efficiency, and control bandwidth of the power conversion circuitry.

Passive energy storage components (e.g. inductors and capacitors) often comprise the majority of the size of dc-dc power converters. In addition, the energy stored in these elements places an underlying limit on the speed with which a converter can respond to changing load conditions. A direct means for improving size and control bandwidth of dc-dc power converters is to increase the switching frequency. Higher switching frequencies reduce the required energy storage enabling the use of smaller-valued—and physically smaller—passive components. The desire to achieve high switching frequencies while maintaining high efficiency has led to the development of a variety of "soft switching" power converter circuits that reduce the losses associated with switching semiconductor devices on and off. These dc-dc converter circuits typically have an "inverter" device or circuit that generates an intermediate waveform with an ac component and a "rectifier" device or circuit that synthesizes the desired dc output. Circuit operation is structured as to mitigate losses during the switching transition of the inverter and/or rectifier devices (e.g., through resonant action).

Many known soft-switched dc-dc converters are based on the class-E inverter, often used in RF amplifier applications. The class-E inverter uses zero-voltage switching (with zero dv/dt at switch turn-on) to eliminate losses that normally occur with hard switching, due to switch capacitance and the overlap of voltage and current in the switch (V-I overlap). This circuit can be adapted to power conversion but only operates efficiently over a narrow range of load and switching frequency. Additionally, regulation is difficult using conventional techniques because duty ratio control is not very effective and frequency control is only feasible over a relatively narrow range.

Existing RF converter topologies suffer from drawbacks. Power converters based on the class-E inverter have peak switch voltage stresses ranging to as much as 4.4 times the input voltage. Related single-inverter-switch resonant converter types operating under zero-voltage switching similarly impose high switch stress, typically factor of greater than or equal to three times the input dc voltage. This high stress requires a relatively high-voltage switch and can incur an efficiency penalty. Other topologies used in RF amplification, such as the class F inverter and its variants, shape waveform harmonics to reduce peak device voltage. However, practical prior art designs of these types have been operated with significant V-I overlap (i.e., not truly "switched" mode), reducing efficiency to levels unacceptable for use in dc-dc converters. Inverters using transmission-line networks or high-order lumped networks simulating transmission lines have been developed that both reduce device voltage stress and provide switched-mode operation (typically using switch duty ratios less than 50%). However, these use large or complicated distributed structures or many lumped elements, often limiting their utility.

A further drawback of most class-E- and class-F-based designs is the size and energy storage of the RF input choke, which limits the miniaturization and transient performance. The "second harmonic" class-E inverter replaces this choke with a small resonant inductor, but still suffers the voltage stress limitations described above. It would thus be desirable to have a resonant "soft-switched" converter with low device voltage stress and small component count and size while maintaining rapid transient response.

SUMMARY

The present invention provides methods and apparatus for dc-dc converters that operate at relatively high frequencies with relatively low losses and device stresses. In addition, relatively few passive components are required and those components store relatively little energy.

In one aspect of the invention, a dc-dc converter for operating at substantially fixed switching frequency comprises a rectifier, and a resonant inverter coupled to the rectifier, the resonant inverter including a switch and a reactive network having four energy storage elements, wherein an impedance magnitude at the output of the switch due to the reactive network has minima at dc and at a frequency near a second harmonic of the switching frequency.

In another aspect of the invention, the dc-dc converter includes first and second dc input terminals, and the switch includes first and second terminals, wherein the four energy storage elements includes first, second, third, and fourth energy storage elements, wherein the first energy storage element is a first capacitance coupled between the first and second switch terminals, the second energy storage element is a first inductor having a first end connected to the first dc input terminal and a second end coupled to the switch first terminal, a direct connection from the second dc input terminal to the switch second terminal, a series connection of a second inductor corresponding to the third energy storage element and a second capacitor corresponding to the fourth energy storage element having a first end connected to the switch first terminal and a second end connected to the switch second terminal, wherein the series connection of the second inductor and the second capacitor is resonant near the second harmonic of the dc-dc converter switching frequency.

In a particular embodiment of the invention, a dc-dc converter for operation at a switching frequency comprises a rectifier, having a first and a second input terminal, a dc input having first and second terminals, and a resonant inverter, the resonant inverter including a switch having first and second terminals, wherein the second switch terminal is connected to the second terminal of the dc input and to the second input terminal of the rectifier. The converter further includes a reactive interconnect, which provides a dc path from the first switch terminal to the first rectifier input terminal, a capacitance between first and second switch terminals, and a path from the first switch terminal to the second switch terminal having low impedance near two times said switching frequency.

In another particular embodiment of the invention, a dc-dc converter for operation at a switching frequency comprises a rectifier, having a first and a second input terminal, a dc input having first and second terminals, and a resonant inverter, the resonant inverter including a switch having first and second terminals, wherein the second switch terminal is connected to the second terminal of the dc input and to the second input terminal of the rectifier. The converter also includes a reactive interconnect with a DC block, connected between the first switch terminal and the first rectifier input terminal. The converter further includes a capacitance between first and second switch terminals, and a path from the first switch terminal to the second switch terminal having low impedance near two times said switching frequency.

In another aspect of the invention, a method for providing a dc-dc converter for operating at substantially fixed switching frequency comprises a rectifier, and couples a resonant inverter to the rectifier, the resonant inverter including a switch and a reactive network having four energy storage elements, wherein an impedance magnitude at the output of the switch due to the reactive network has minima at dc and at a frequency near the second harmonic of the switching frequency.

BRIEF DESCRIPTION OF THE DRAWINGS

The foregoing features of this invention, as well as the invention itself, may be more fully understood from the following description of the drawings in which.

DETAILED DESCRIPTION

The present invention provides methods and apparatus to enable dc-dc conversion at high frequencies with low losses and device stresses while requiring few passive components and little energy storage. This is accomplished in a topology that utilizes waveshaping of the voltage at the terminals of a controllable switch to provide the desirable features of low voltage stress and low switching loss. Only a few, relatively small energy storage components are required. In exemplary embodiments of the invention, a matching network or transformer may not be necessary to provide voltage transformation.

In the present invention a passive resonant network (having multiple critical frequencies) is periodically excited to provide voltage conversion through resonant action. The network can be tuned to obtain, when properly excited, a voltage across the main switch having low peak value, and providing switched-mode operation. The passive network can be tuned to provide low switching losses (including near zero voltage across the switch at switch turn-on), and to obtain zero dv/dt at switch turn on. These are desirable conditions for operating at high frequencies (e.g., 30 MHz-3 GHz, VHF-UHF). Exemplary embodiments of the invention can be viewed as an inverter coupled to a rectifier with an interconnect that can determine the specifics of the energy transfer.

Power may be transferred from input to output in two distinct ways, depending on the rectifier structure and reactive interconnect. In one embodiment, the interconnect includes a DC block. Power is transferred purely at AC with a DC output voltage that can be either higher or lower than the input voltage, i.e. in buck-boost operation. Another embodiment uses an interconnect which acts as a short at DC, and transfers a fraction of the total power at DC. This can yield lower losses than those associated with purely AC power transfer in cases where the desired output voltage is higher than the input voltage, i.e. in boost operation.

Figure 1A:
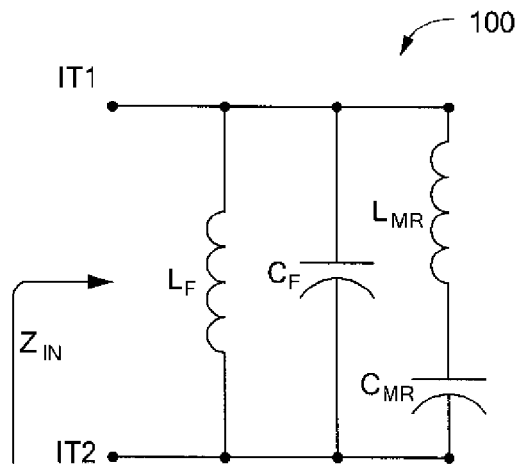
FIG. 1A is a schematic diagram of a low-order lumped network having four energy storage elements.
Figure 1B:
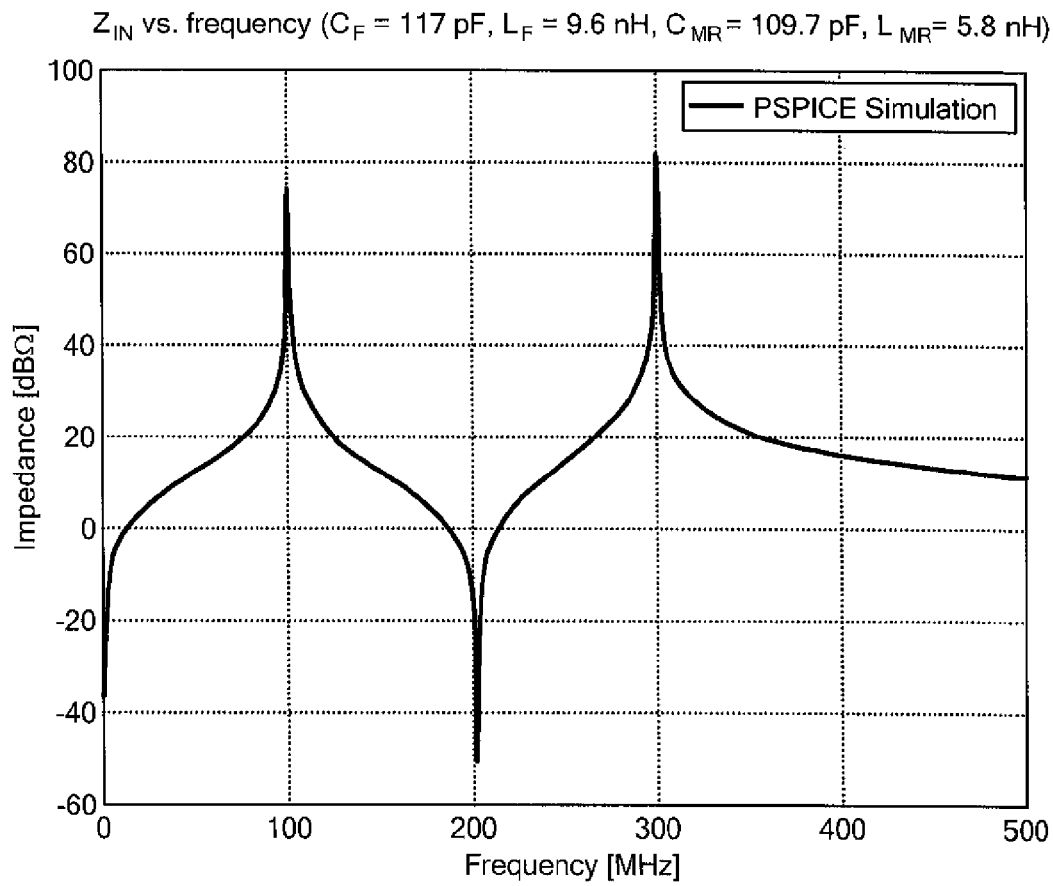
FIG. 1B is a graphical depiction of impedance magnitude versus frequency.

FIG. 1A shows a simple resonant passive network 100. The magnitude of the input impedance of the network ($Z_{IN}$) is illustrated in FIG. 1B. The impedance of this network 100 has maxima at two frequencies (poles). The impedance is zero at DC and at a frequency somewhere between the two maxima. By incorporating a controllable switch, a reactive connection network, and a resonant rectifier, efficient dc-dc power conversion can be achieved.

The network 100 includes a first inductor $L_F$ coupled across first and second terminals IT1, IT2, and a first capacitor $C_F$ coupled in parallel with the first inductor $L_F$. A second inductor $L_{MR}$ and a second capacitor $C_{MR}$ are coupled end-to-end in parallel with the first capacitor $C_F$.

An embodiment 200 implementing the network 100 of FIG. 1A is shown in FIG. 2. A switch $S_{main}$ is coupled in parallel with the first capacitor $C_{FEXTRA}$. The capacitance of the semiconductor switch $S_{main}$ and the capacitor $C_{FEXTRA}$ form the capacitor $C_F$ in the network of FIG. 1A. Note that while this embodiment 200 has some topological elements in common with the conventional SEPIC converter and its variants, the design, component values, stresses, and operational characteristics are quite different.

An exemplary interconnect 250 between the inverter 260 and a rectifier 270 includes an interconnect capacitor $C_S$ and an interconnect inductor $L_s$ coupled in series.

The rectifier 270 includes a diode $D_1$ coupled to the interconnect 250 and a rectifier inductor $L_R$ such that a node is formed by the interconnect 250, the anode of the diode $D_1$, and a terminal of the rectifier inductor $L_R$.

Components $L_{MR}$ and $C_{MR}$ are tuned to be series resonant close to the second harmonic of the switching frequency, resulting in a low impedance value at the second harmonic as viewed from the drain/source port of the switch.

The resonant components $L_F$ and $C_F$ are tuned in conjunction with $L_{MR}$ and $C_{MR}$ such that the input impedance $Z_{IN}$ in FIG. 1A presents a relatively high impedance at the switching frequency and the third harmonic of the switching frequency when placed in parallel with the equivalent load impedance (in this case the interconnect network followed by the rectifier). This is done in such a manner that the voltage $v_{ds}$ in FIG. 2A can support the desired switch voltage waveform, which is approximately trapezoidal in shape and contains a dominant fundamental component and a smaller third harmonic component. It is possible to tune the network portion represented by FIG. 1A such that the impedance maxima (poles) are at the fundamental and third harmonic, and this represents a good design starting point. Component values for tuning the poles of FIG. 1A at the fundamental and third harmonic and placing the zero at the second harmonic can be determined starting from a selected value for $C_F$:

$$L_F = \frac{1}{9\pi^2 f_S^2 C_F} \quad L_{MR} = \frac{1}{15\pi^2 f_S^2 C_F} \quad C_{MR} = \frac{15}{16} C_F$$

However, in some embodiments, the maxima of the network of FIG. 1A are not at the fundamental and third harmonic. Rather, the frequencies of the maxima are adjusted such that the net impedance looking into the switch output port at the fundamental and third harmonic of the switching frequency $f_S$, (when considered in parallel with the load network) supports the desired switch voltage waveform $v_{ds}$. An exemplary plot of impedance magnitude and phase at the drain node of a converter for operation at 30 MHz is shown in FIG. 2B.

Figure 2A:
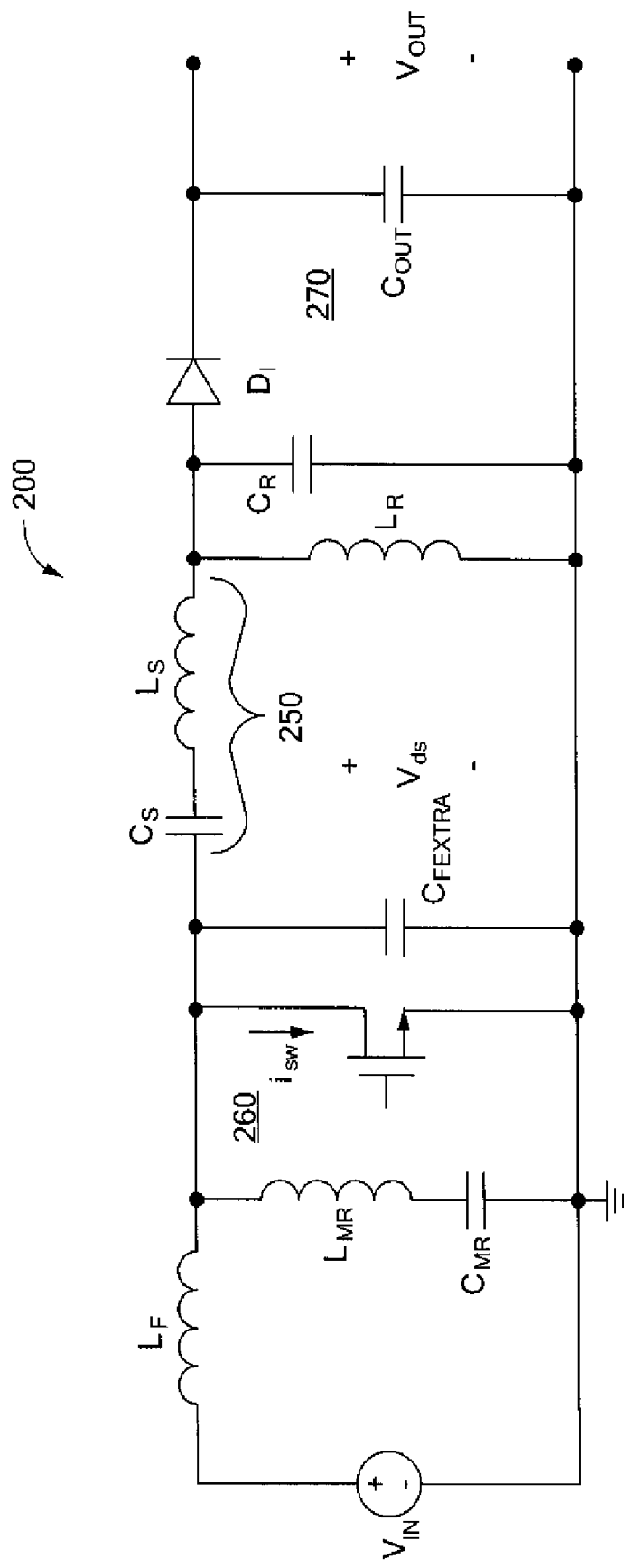
FIG. 2A is a schematic diagram of a dc-dc converter.
Figure 2B:
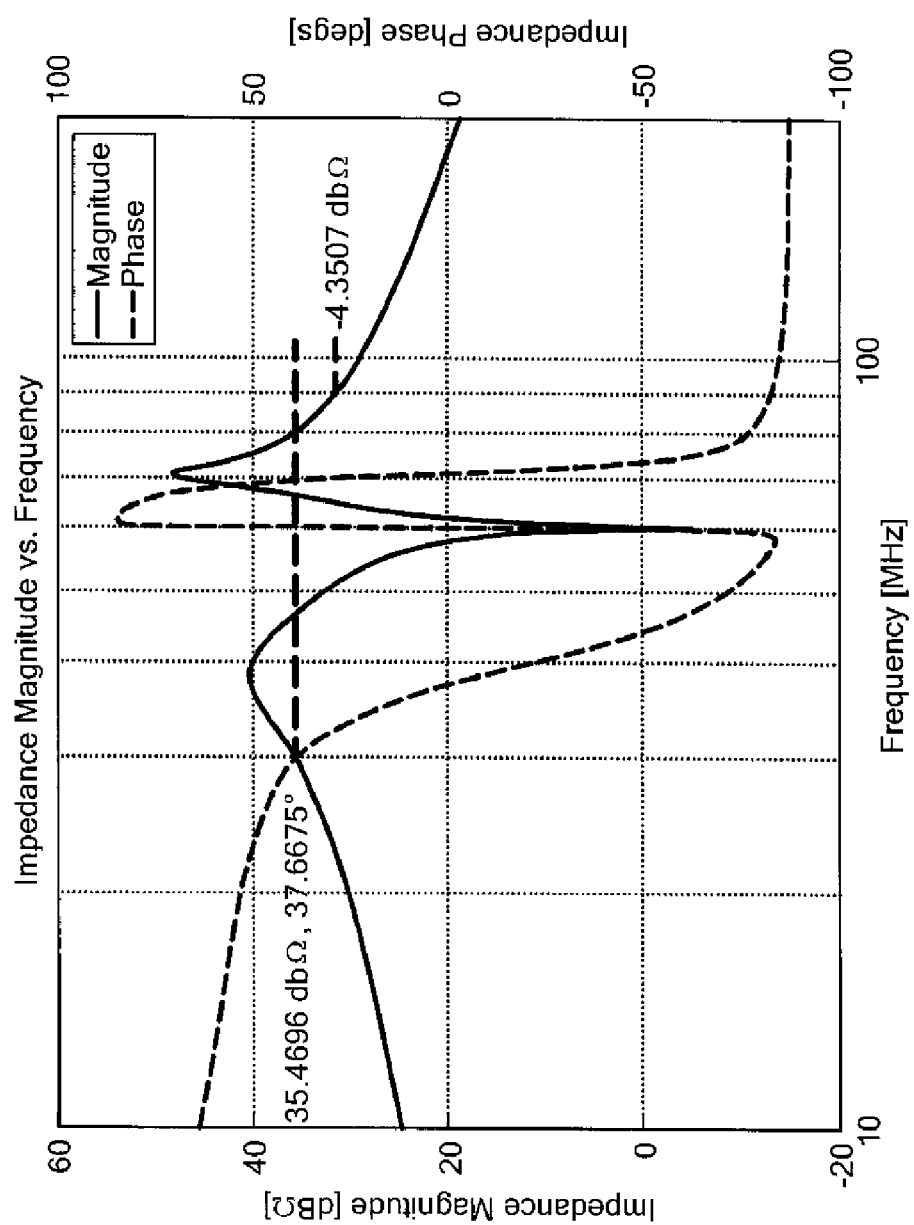
FIG. 2B is a graphical depiction of impedance magnitude and phase versus frequency.

The rectifier 270 in FIG. 2A may be temporarily replaced by a resistance which is equivalent in a describing function sense. Then, looking into the drain node of the converter, the relative magnitudes of the impedance $Z_{ds}$ at the fundamental and the third harmonic of the switching frequency determine how large these components are in the drain to source voltage $v_{ds}(t)$. Thus, the ratio of these impedance magnitudes has a direct impact on the maximum voltage across the switch. This ratio may be controlled by changing the magnitude of the impedance either at the fundamental or at the third harmonic. For many designs, if the magnitude of impedance at the fundamental is larger than that at the third harmonic, the result is low peak voltage across the switch.

Note that $C_F$ incorporates the capacitance of the semiconductor switch, and in some embodiments may entirely comprise switch capacitance. Also, the desired maximum operating power of the converter can be increased by selecting a larger value of $C_F$ or decreased by reducing $C_F$. Because the inductor $L_F$ can act as a resonant inductor, it may have a very small numerical value and low energy storage as compared to the rf choke found in many conventional inverters such as the traditional class E inverter. The detailed tuning of $L_F$ is accomplished in conjunction with the rectifier to obtain desirable waveform characteristics at the switch terminals. These characteristics may include zero-voltage switching (ZVS) of the semiconductor switch and zero dv/dt across the switch at switch turn on (It is recognized that highest efficiency operation may occur for other tuning objectives, however.) The inverter switch $S_{main}$ in FIG. 2A can be activated at fixed frequency and fixed duty ratio, with the duty ratio selected to provide switched-mode operation with low switching loss (i.e. near zero-voltage switching). Typical duty ratios for designs of this type fall between 20 and 50 percent. Control of the average converter output (voltage, current, or power), can be obtained, for example, by on/off control of the converter cell.

The reactive interconnect network 250, shown in the embodiment of FIG. 2A as the series connection of elements $C_S$ and $L_S$, serves multiple functions. First, it blocks dc such that the rectifier 270 is dc-isolated from the input and the output voltage may be held at voltages above or below the input voltage. Second, the interconnect network 250 acts in combination with the rectifier 270 to determine the power delivered from the inverter 260 to the rectifier network at the fundamental and harmonic frequencies. The interconnect network 250 may also include a transformer or autotransformer to provide a larger voltage step and/or galvanic isolation, if these are desired.

Figure 2C:
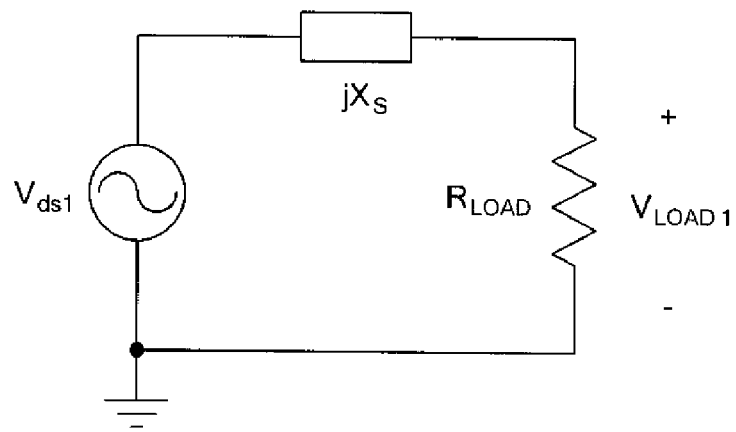
FIG. 2C is a schematic diagram of a model of a dc-dc converter.

FIG. 2C shows a converter represented by a voltage source for the inverter, a reactive interconnect $X_S$, and a resistive load $R_{LOAD}$ for the rectifier. Consider how the desired value of the reactance $X_S$, formed by $L_S$ and $C_S$, can be obtained. $X_S$ forms part of a reactive divider that sets the output power delivered to $R_{LOAD}$. It can be seen that one can determine for a given output power $V_{load1,RMS} = \sqrt{P_{OUT} \cdot R_{LOAD}}$. Knowing that the effective value of the fundamental component of $v_{ds}(t)$ (approximated by a square wave) is $$v_{ds1,RMS} = \frac{4}{\pi\sqrt{2}} \cdot V_{IN},$$

one can obtain the desired reactance $X_S$ as:

$$X_S = R_{LOAD} \cdot \sqrt{\left(\frac{v_{ds1,RMS}}{v_{load1,RMS}}\right)^2 - 1}$$

$L_S$ and $C_S$ are then selected to provide this desired reactive magnitude (with inductive or capacitive phase) and the desired frequency selectivity.

The rectifier topology used in the resonant dc-dc converter embodiment of FIG. 2A comprises a single diode $D_1$ feeding a constant (capacitively filtered) output voltage $V_{OUT}$, a resonant inductor $L_R$ that provides a dc path to ground, and a resonant capacitor in parallel with the resonant inductor. This capacitor may equivalently be placed in parallel with the diode and effectively absorbs the diode capacitance $C_D$ to form a total capacitance $C_R$. In some implementations $C_R$ may entirely comprise diode capacitance.

Figure 3:
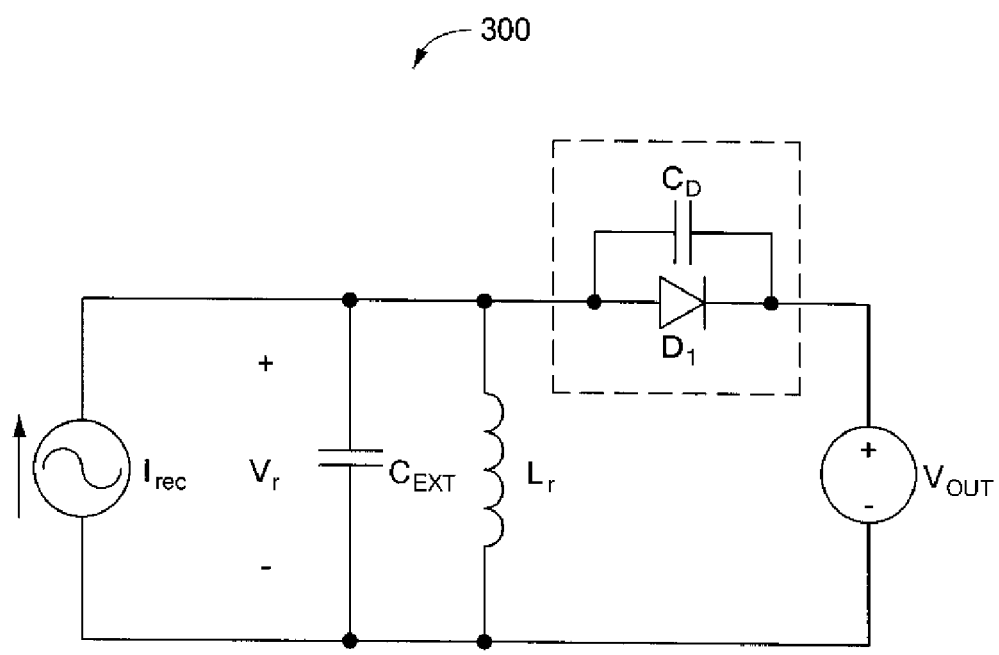
FIG. 3 is a schematic diagram of a rectifier structure.

For design purposes the rectifier can be modeled as illustrated in FIG. 3, which shows the schematic of the resonant rectifier 300 loaded with a constant voltage at the output. The rectifier is modeled as being driven by a sinusoidal current source of magnitude $I_{IN}$. A resonant capacitance $C_R$ (not shown) represents the sum of an external capacitance $C_{EXT}$ and an equivalent diode capacitance $C_D$. The resonant inductor $L_R$ provides a path for the DC current and resonates with the capacitance $C_R$. In one embodiment, this resonance can be selected such that the input looks nearly resistive at the fundamental frequency (That is, the fundamental of the voltage $v_r$ is in phase with the drive current $i_{rec}$). The input current is selected to provide the desired output power.

The amplitude and conduction angle of the diode $D_1$ current depend on the component values. By adjusting the net capacitance $C_R$ in parallel with the resonant inductor $L_R$, it is possible to trade off the length of the conduction interval and the peak reverse voltage across the diode $D_1$. In some implementations it is convenient to have a conduction angle close to 50 percent, as this provides a good tradeoff between peak diode forward current and reverse voltage. This additional capacitance can either be added externally or can be solely provided by additional diode area, which can have the added benefit of reducing the overall conduction loss in the rectifier.

It will be appreciated that there are a range of variants to the converter design that fall within the scope of this invention. For example, there are a range of alternative implementations of the converter source network that can provide the same dynamics and circuit performance as that in FIG. 1A. Similarly, higher order reactive connection networks can be used to provide more sophisticated adjustment of the rectifier loading. Also, a lower-order reactive interconnect—such as a capacitor—can be used. Likewise, different configurations of the rectifier are useful in certain applications.

Figure 4A:
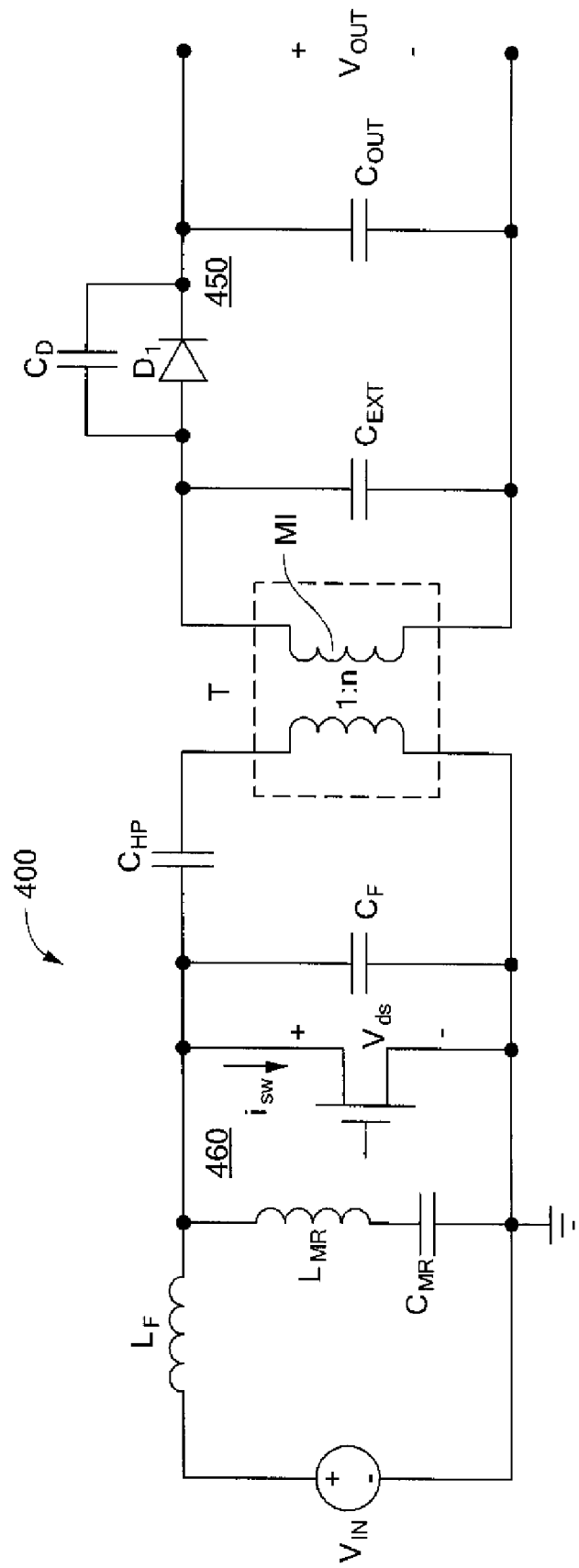
FIG. 4A is a schematic diagram of a dc-dc converter having a transformer.

For example, FIG. 4A shows an embodiment of a converter 400 in which electrical isolation is achieved by using a transformer T to couple the rectifier 450 to the high frequency inverter 460. The magnetizing inductance MI of the transformer T is used as the rectifier inductor $L_R$.

Figure 4B:
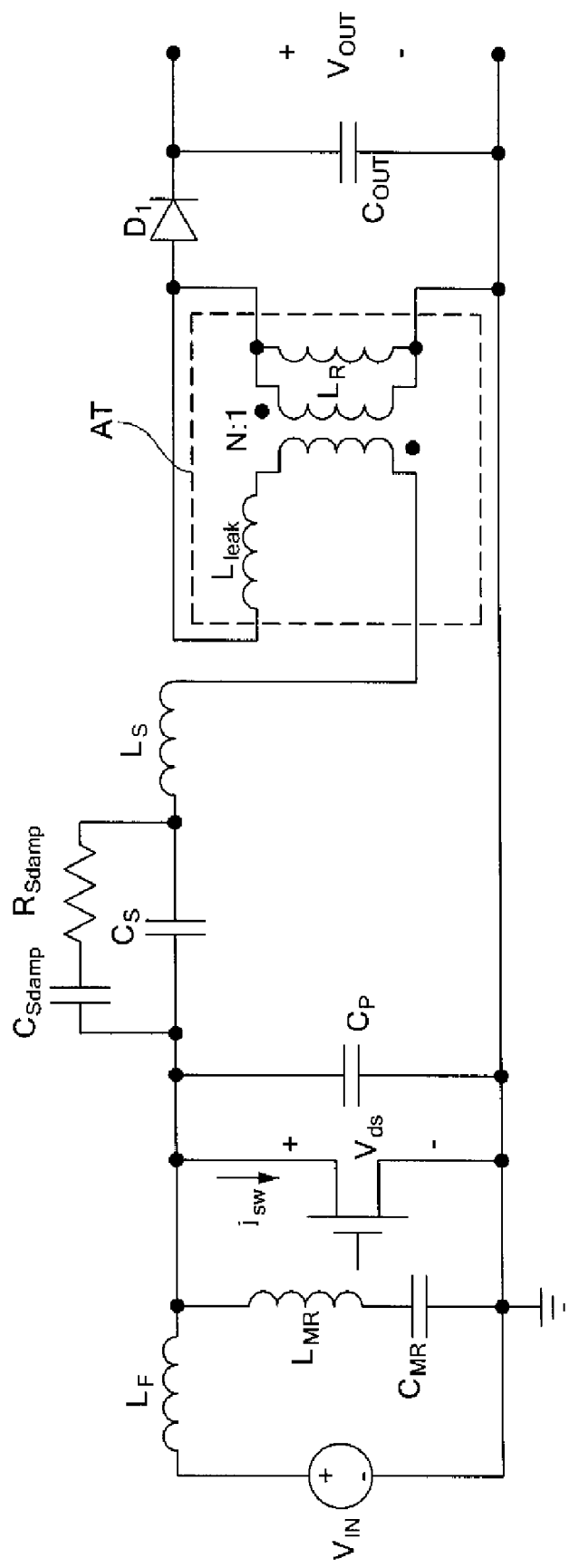
FIG. 4B is a schematic diagram of a dc-dc converter having an autotransformer.

Similarly, as shown in FIG. 4B, an autotransformer AT can take the place of the transformer, which at times makes better use of the magnetic windings.

Figure 4C:
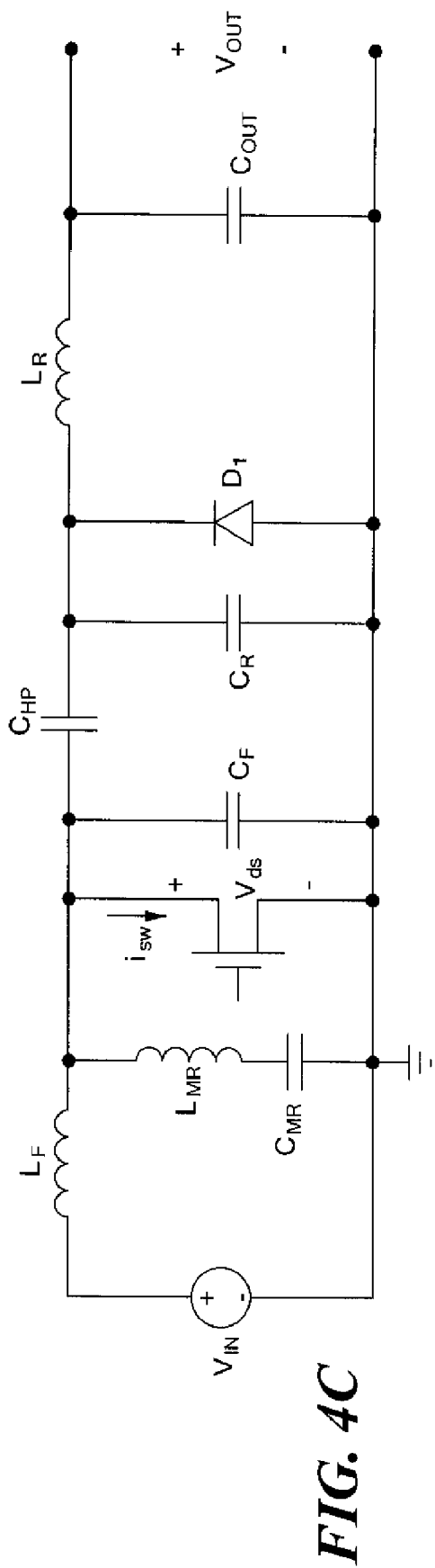
FIG. 4C is a schematic diagram of a dc-dc converter having a shunt rectifier.
Figure 4D:
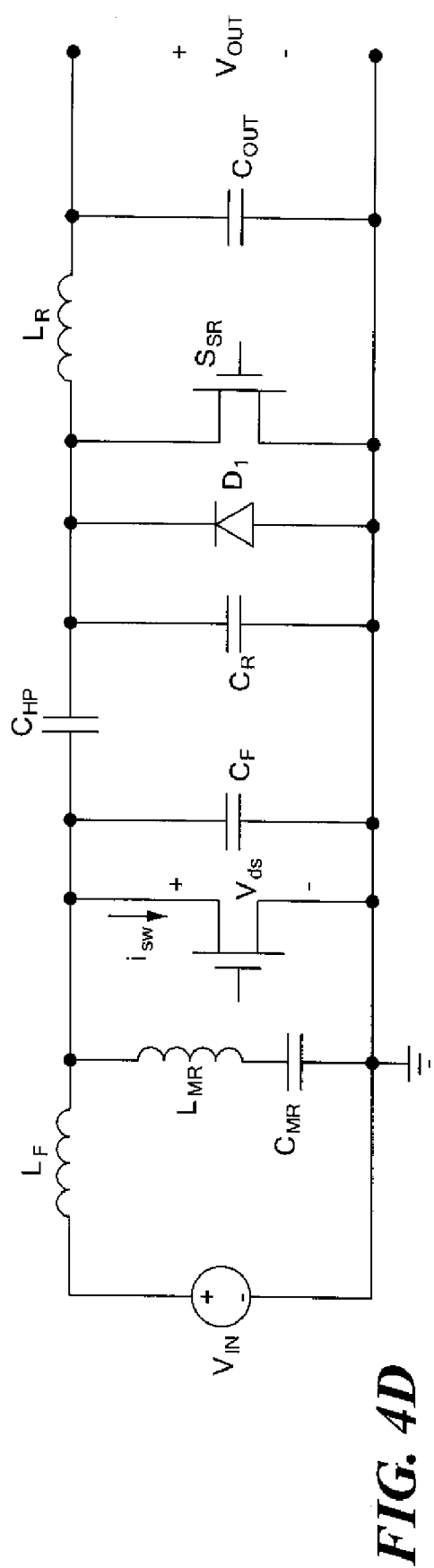
FIG. 4D is a schematic diagram of a dc-dc converter having a synchronous rectifier.

FIG. 4C shows another embodiment in which the rectifier diode $D_1$ has the anode terminal connected to ground. In this configuration, the capacitance $C_R$ comprises the device capacitance $C_D$ (not shown) and any external capacitance $C_{EXT}$ (not shown) required for rectifier tuning. This embodiment also facilitates the implementation of "synchronous rectification", in which a switch $S_{SR}$ may also carry the current through the rectifier, thus reducing the conduction losses. A dc-dc converter implementing "synchronous rectification" is shown in FIG. 4D.

To design the converter system, one can start by realizing a rectifier with the desired behavior. Once the equivalent impedance of the resonant rectifier (at a given output power and voltage) is known, the remainder of the converter can be designed and connected to the resonant rectifier. The interconnect network is selected to provide appropriate output power. Due to the nonlinearity of the converter and the interaction among its parts, additional tuning may be required to achieve maximum efficiency and/or ZVS and/or zero dv/dt characteristics at the drain voltage of the active switch.

Figure 5:
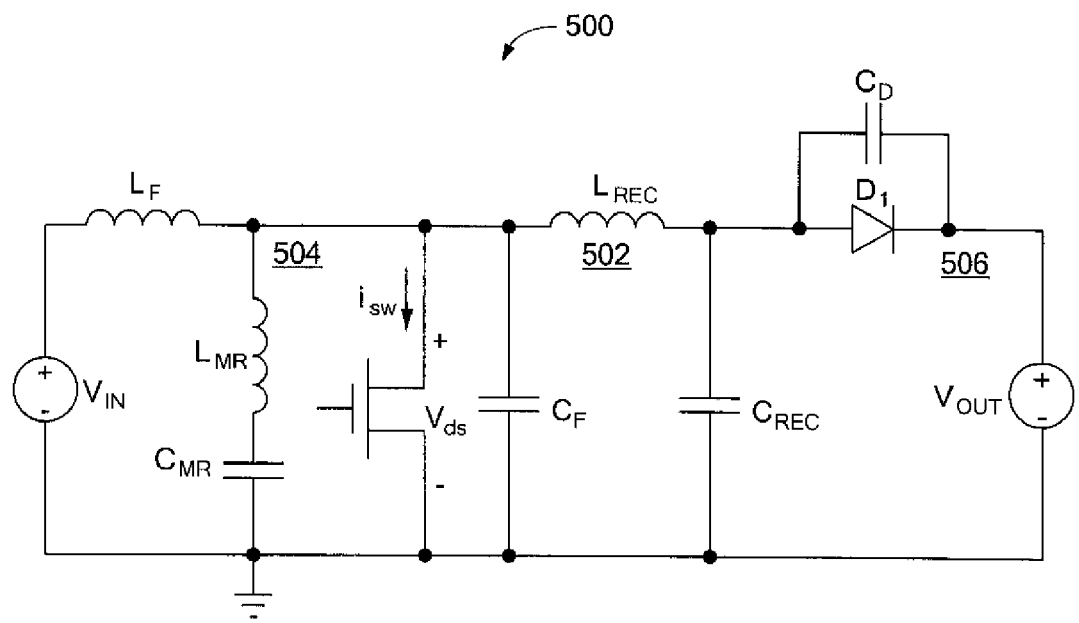
FIG. 5 is a schematic diagram of a dc-dc resonant boost converter.

FIG. 5 shows exemplary embodiment 500 of the invention in which an interconnect 502 from the inverter 504 to the rectifier 506 does not include a DC block. The interconnect 502 includes $L_{REC}$. Capacitor $C_{REC}$ has a first terminal coupled to a point between the interconnect 500 and the anode of the diode $D_1$ of the rectifier 506 and a second terminal coupled to ground. In this case, power is transferred at both AC and DC, with the total amount of DC power transferred determined by the ratio of the input and output voltages. The portion of power transferred at DC is not subject to AC loss mechanisms, which are usually larger than those at DC, thereby improving the overall efficiency. This DC power transfer does not substantially affect the AC operation of the circuit. It should be noted that this technique is only applicable where the input voltage is smaller than the output voltage.

Figure 6:
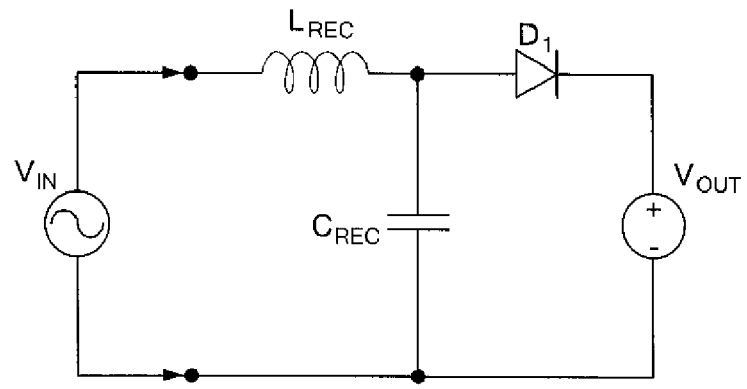
FIG. 6 is a schematic diagram of a rectifier structure suitable for a resonant boost converter.

For the AC portion of the power transfer, a similar tuning procedure applies to the rectifier 506 in this embodiment as to the rectifier in the FIG. 3. In this case, to tune the rectifier 506, a sinusoidal voltage source $V_{IN}$ with DC offset is applied to the rectifier input, as seen in FIG. 6. A DC source $V_{OUT}$ is connected to the output terminals of the rectifier with a value equal to the output voltage of the converter. Thereafter, $L_{REC}$ and $C_{REC}$ can be adjusted such that the rectifier appears resistive at the fundamental frequency. The output power is then controlled by changing the impedance of the interconnect 502 in the same fashion as for the embodiment in FIG. 2A. The total power delivered will be equal to the sum of the AC power and the DC power.

At VHF frequencies, traditional hard-switched gate schemes typically incur too much loss for acceptable efficiency. Instead, with a power stage and control scheme designed to operate at a fixed frequency and duty ratio, resonant gating becomes advantageous. By recovering a portion of the gate energy each cycle, much lower power is required to drive the gate, minimizing the effect gating has on overall converter efficiency.

Figure 9:
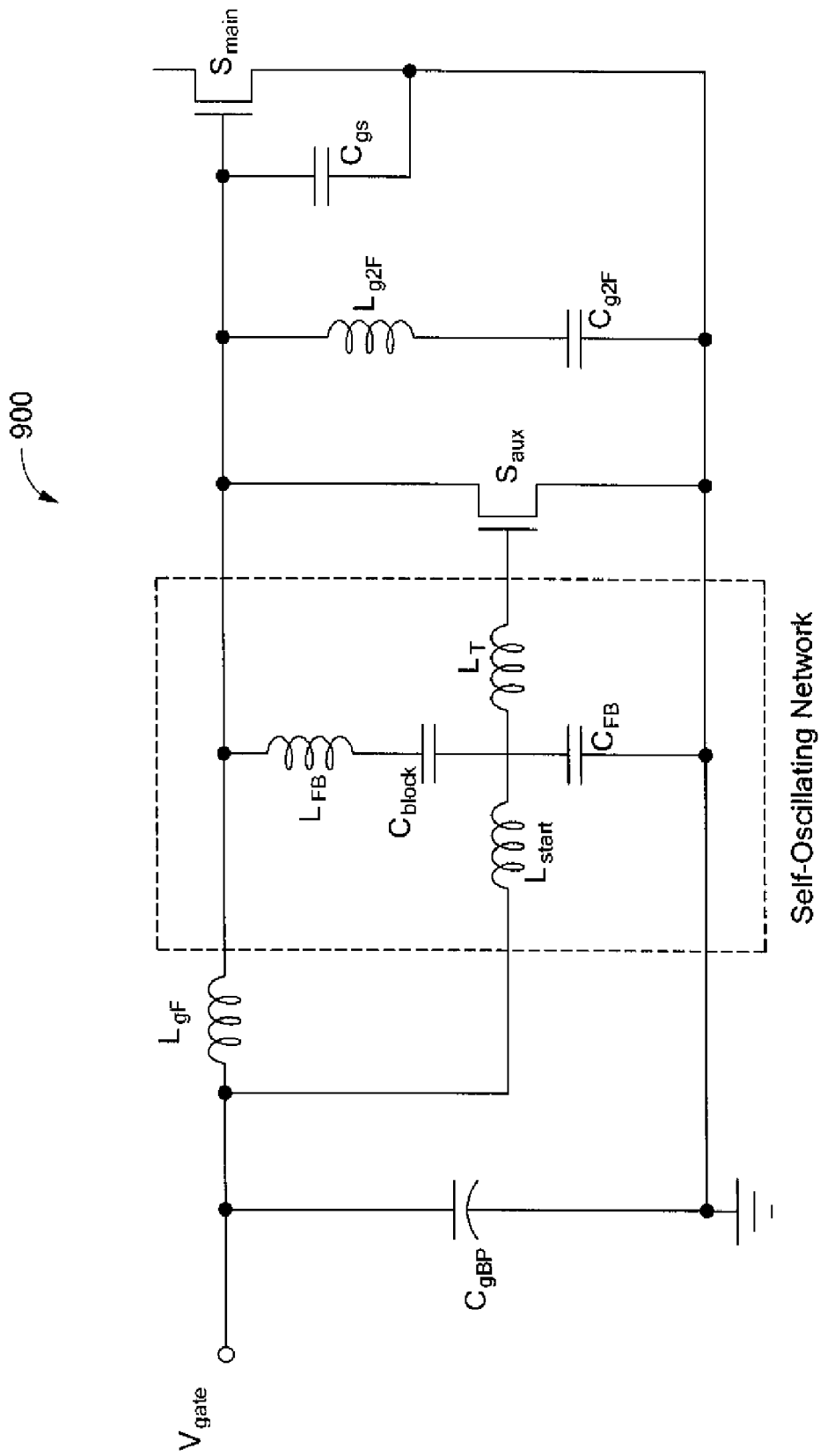
FIG. 9 is a schematic diagram of an exemplary gate control circuit.

FIG. 9 shows a gate drive circuit 900 that realizes a trapezoidal gate waveform that does not drive the gate negative, a requirement of many switches, and which yields near minimum loss. The gate drive circuit 900 is based on the low order lumped network of FIG. 1A. It shapes the main-switch gate voltage to be approximately square. Additional components provide a gate signal to the auxiliary MOSFET $S_{aux}$ such that a self-sustained oscillation is achieved.

Figure 10:
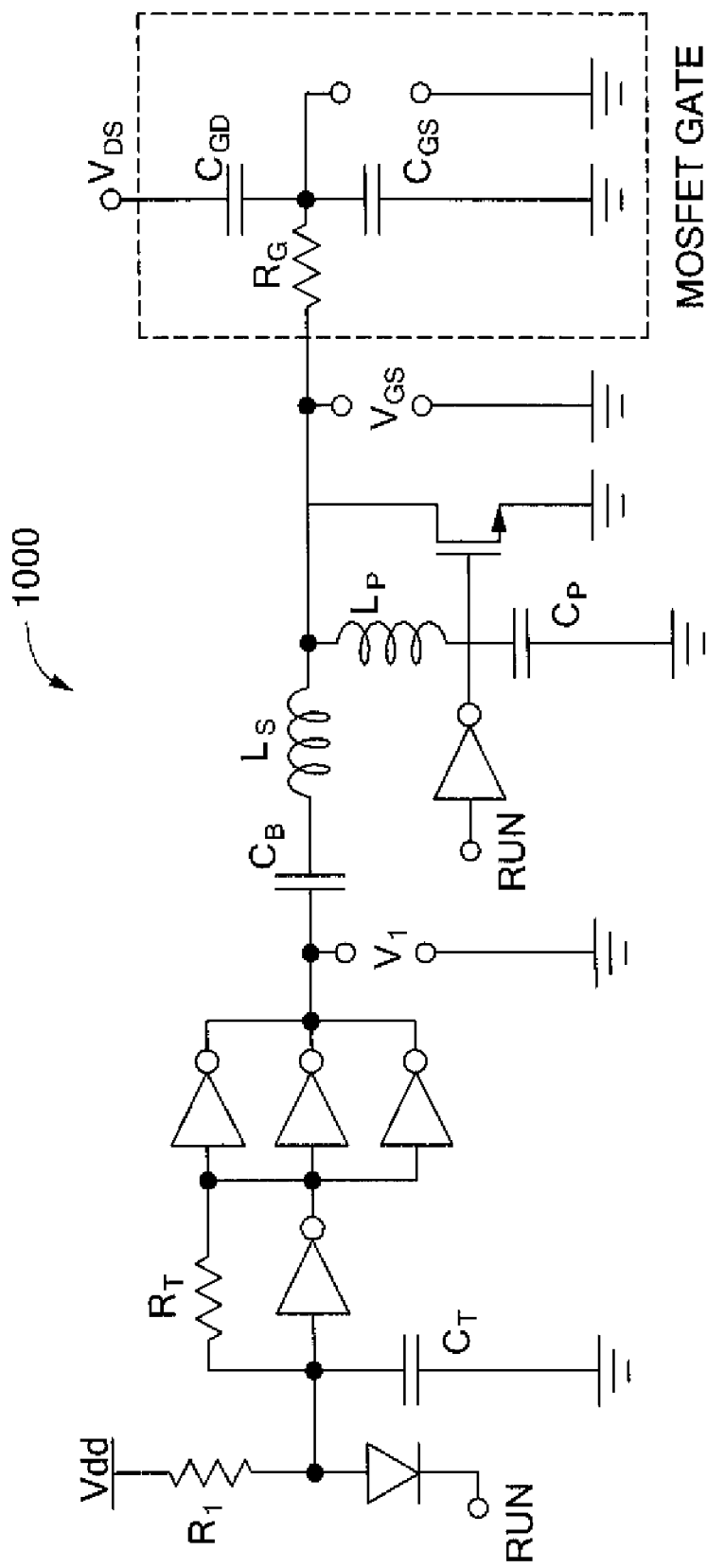
FIG. 10 is a schematic diagram of another exemplary gate control circuit.

FIG. 10 shows an alternative resonant gate drive circuit 1000 with a sinusoidal waveform. This system is an attractive gating technique for switches that allow positive and negative gate voltage. The shunt branch provides an alternate path for resonating current minimizing losses in the logic inverters.

It is understood that a variety of other gate control circuits can be used to meet the needs of a particular application.

The present invention provides significant advantages over prior art converter designs. It provides efficient dc-dc conversion at very high frequencies, with few small-valued passive components and low device stresses. Due to the small values and energy storage of the passive components, the transient response can be very fast compared to conventional designs. Moreover, in many implementations the dependence of operating power on input voltage is reduced as compared to conventional resonant converter designs.

EXAMPLES 1. 30 MHz Resonant dc-dc Converter

TABLE 1

| 30 MHz RESONANT CONVERTER SPECIFICATIONS | |
|---|---|
| Input Voltage Range 160-200 V | Output Voltage 33 V |
| Switching Frequency 30 MHz | Output Power 210-290 W |

Figure 7:
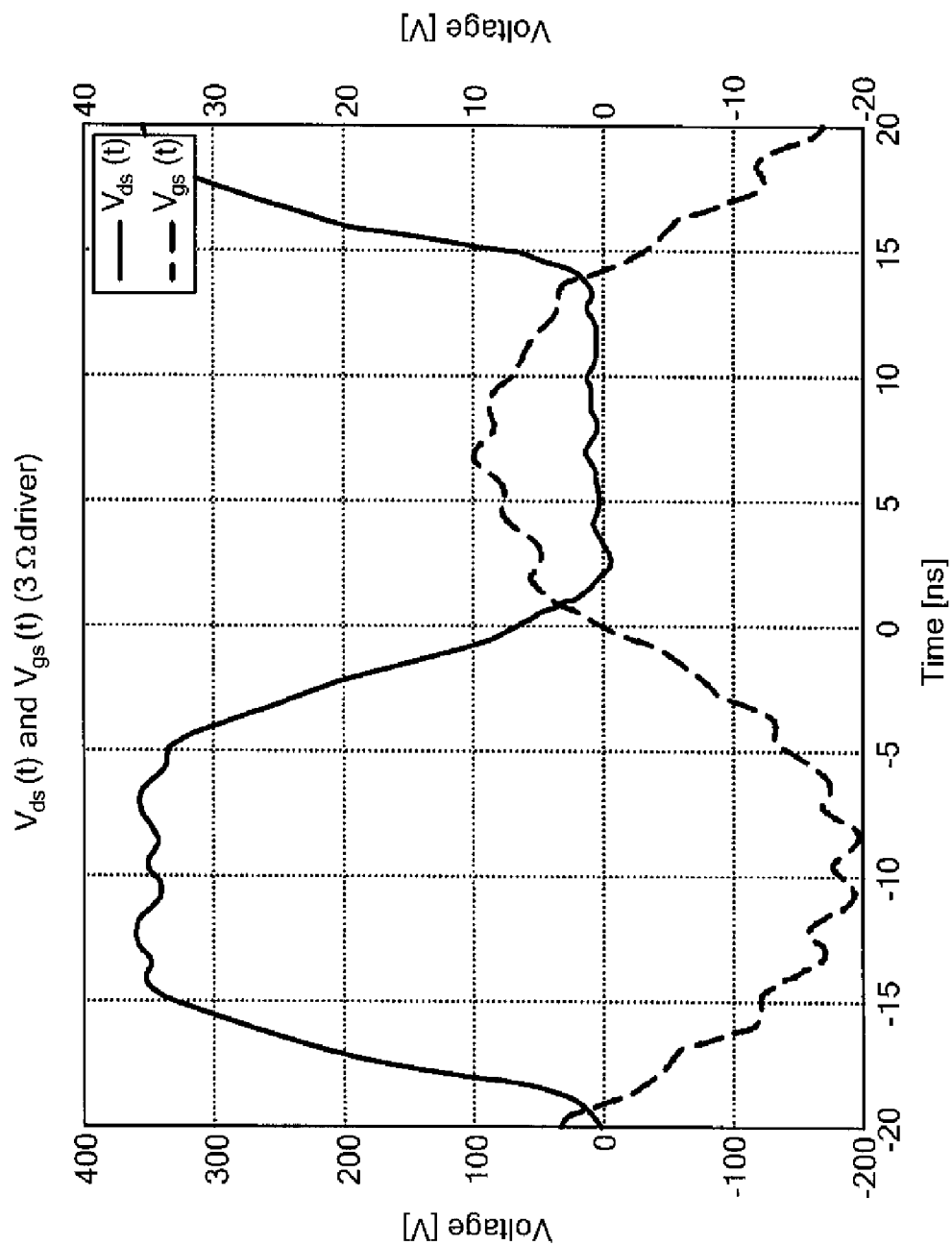
FIG. 7 is a graphical depiction of drain and gate voltages.

A 30 MHz resonant converter conforming to FIG. 4B was constructed to the specifications in TABLE 1. The operational drain voltage and gate voltage waveforms for the converter are found in FIG. 7. Note that the drain voltage exhibits the salient characteristics of this technique, whereby the peak drain voltage is less than 2.4 times the input voltage, and the overall voltage waveform shape is approximately trapezoidal. The component values are included in TABLE 2.

TABLE 2

| 30 MHz RESONANT CONVERTER COMPONENT VALUES | | | |
|---|---|---|---|
| Part | Measured Value | Q | Part number |
| $C_{IN}$ | 4 µF (250 V Ceramic) | | 4× CKG57NX7R2E105M |
| $L_F$ | 384 nH (off-board measurement) | 197 | 9 turns of AWG 16 wire on a ⅜ in. diam. Teflon ® rod with 14 turns/in. threads |

TABLE 2-continued

30 MHz RESONANT CONVERTER COMPONENT VALUES

| Part | Measured Value | Q | Part number |
|---|---|---|---|
| MOSFET | ARF521 | | APT Inc. |
| $L_{MR}$ | 414 nH | 185 | 9 turns AWG 16 wire on a 3/8 in. diam. Teflon ® rod with 14 turns/in. threads |
| $C_{MR}$ | 16.3 pF (porcelain) | 10 K 10 K | 2 × 56 pF ATC100B560JW 1 × 39 pF ATC100B390JW |
| $C_P$ | 28 pF | 3 K | Parasitic drain capacitance |
| $C_S$ | 4 nF | | 4 × 1 nF MC22FD102J-F |
| $C_{Sdamp}$ | 10 nF | | 15 nF C3225C0G2E153J |
| $R_{Sdamp}$ | 10 Ω | | (SMD1012) ERJ-S14F10R0U |
| $L_S$ | 175 nH | 195 | 5 turns AWG 16 wire on a 3/8 in. diam. Teflon ® rod with 14 turns/in. threads |
| Auto-trans-former | N = 0.83 $L_{LEAK}$ = 84.8 nH $L_\mu$ = 78.5 nH | | Primary: 2 turns AWG 16 wire Secondary: 3 turns AWG 16 wire on a 9/16 in. diam. Teflon ® rod with 12 turns/in. threads |
| Diode | 2× CSD10030 | | Cree Inc. |
| $C_{OUT}$ | 4 μF (250 V Ceramic) | | 4× |

2. 110 MHz Resonant Converter

Figure 8:
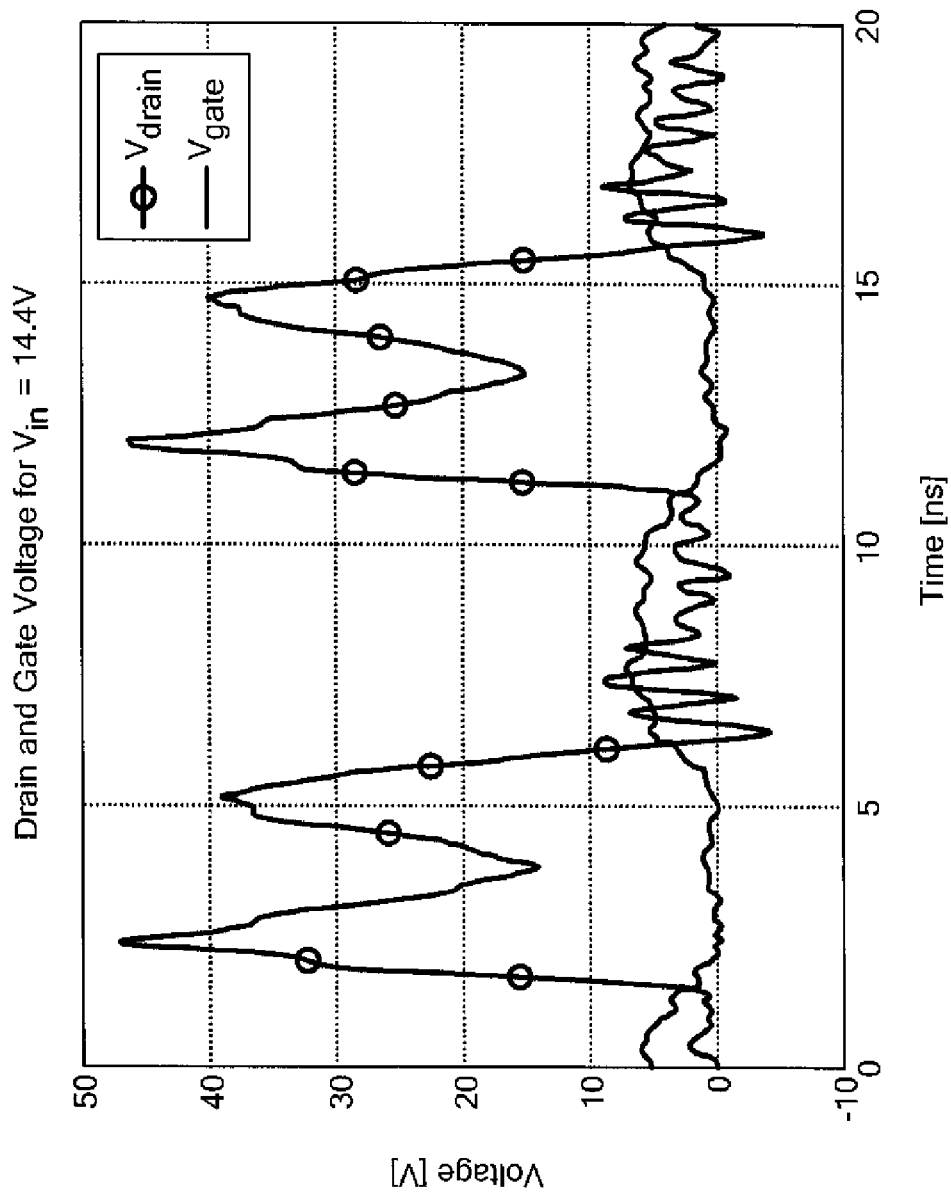
FIG. 8 is a graphical depiction of drain and gate voltages.

A 110 MHz resonant converter providing a boost conversion function was constructed to the specifications in TABLE 3. The converter topology conformed to the schematic in FIG. 5. The operational drain voltage and gate voltage waveforms for the converter are found in FIG. 8. The component values are included in TABLE 4.

TABLE 3

110 MHz RESONANT BOOST SPECIFICATIONS

| | |
|---|---|
| Nominal Input Voltage 14.4 V | Nominal Output Voltage 33 V |
| Input Voltage Range 8-16 V | Output Voltage Range 22-34 V |
| Switching Frequency 110 MHz | Nominal Output Power 23 W |

TABLE 4

110 MHz RESONANT BOOST COMPONENT VALUES

| | |
|---|---|
| LF 33 nH | LMR 12.5 nH |
| Lrect 22 nH | CMR 39 pF |
| Crect 10 pF | Cout 70 μF |
| Smain Freescale MRF6S9060 | D1 Fairchild S310 |

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A dc-dc converter for operating at substantially fixed switching frequency across a range of voltage conversion ratios and output powers, the dc-dc converter comprising:
   a rectifier; and
   a resonant inverter coupled to the rectifier, the resonant inverter including a switch and a reactive network having exactly four energy storage elements, wherein an impedance magnitude at the output of the switch due to the reactive network has minima at dc and at a frequency near a second harmonic of the switching frequency.

2. The dc-dc converter of claim 1, wherein an impedance of the reactive network and loading by the rectifier shape a voltage across the switch such that a frequency content dominantly comprises dc, the fundamental of the switching frequency, and the third harmonic of the switching frequency.

3. The dc-dc converter of claim 1, wherein an impedance of the reactive network and loading by the rectifier shape the switch voltage to provide substantially zero-voltage switching of the switch.

4. The dc-dc converter of claim 3, wherein the impedance of the reactive network and loading by the rectifier further shape the switch voltage to a quasi-trapezoidal waveform having a peak value of less than three times the dc input voltage during steady-state operation.

5. The dc-dc converter of claim 1, further including first and second dc input terminals, wherein switch includes first and second terminals, wherein the four energy storage elements includes first, second third, and fourth energy storage elements, wherein the first energy storage element is a first capacitance coupled between the first and second switch terminals, the second energy storage element is a first inductor having a first end connected to the first dc input terminal and a second end coupled to the switch first terminal, a direct connection from the second dc input terminal to the switch second terminal, a series connection of a second inductor corresponding to the third energy storage element and a second capacitor corresponding to the fourth energy storage element having a first end connected to the switch first terminal and a second end connected to the switch second terminal, wherein the series connection of the second inductor and the second capacitor is resonant near the second harmonic of the dc-dc converter switching frequency.

6. The dc-dc converter of claim 5, further including first and second dc output terminals, a rectifying device having a first and second terminal where the second terminal is connected to the first dc output terminal, a third inductor corresponding to a fifth energy storage element having a first terminal connected to the switch first terminal and a second terminal connected to the rectifying device first terminal, a third capacitor corresponding to a sixth energy storage element having a first terminal connected to the rectifying device first terminal and a second terminal connected to the switch second terminal, a direct connection from the switch second terminal to the second dc output terminal.

7. The dc-dc converter of claim 6, wherein the first capacitance is composed entirely of the switch parasitic capacitance.

8. The dc-dc converter of claim 6, wherein the third capacitance is composed entirely of the rectifying device parasitic capacitance.

9. The dc-dc converter of claim 1, wherein the converter provides a path for dc current from the converter input to the converter output and delivers a fraction of the total converted power at dc.

10. The dc-dc converter of claim 1, wherein the output of the converter is regulated by on-off modulation of the power stage.

11. The dc-dc converter of claim 1, wherein the switching control is implemented by driving the inverter switch with a resonant gate drive scheme.

12. The dc-dc converter of claim 1, wherein relative magnitudes of impedance $Z_{ds}$ at the fundamental and the third harmonic of the switching frequency form a ratio greater than one determining a maximum voltage across the switch of less than or equal to 2.4 times the input voltage.

13. A dc-dc converter for operation at a single switching frequency for variable output power, the dc-dc converter comprising:
   a rectifier; and
   a dc input having first and second terminals; and
   a resonant inverter, the resonant inverter including a switch having first and second terminals, wherein the second switch terminal is connected to the second terminal of the dc input; and
   a reactive network having two magnetic elements and two capacitive elements, wherein said reactive network provides:
   a dc path from the first dc input terminal to the first switch terminal;
   a capacitance between first and second switch terminals; and
   a path from the first switch terminal to the second switch terminal having low impedance near two times said switching frequency.

14. The dc-dc converter of claim 13, wherein said resonant network provides waveshaping of the voltage across the terminals of the inverter switch such that said voltage has a quasi-trapezoidal waveform providing near-zero turn-off and turn-on conditions for the switch.

15. A method for providing a dc-dc converter for operating at substantially fixed switching frequency across a range of voltage conversion ratios and powers, comprising:
   providing a rectifier; and
   coupling a resonant inverter to the rectifier, the resonant inverter including a switch and a reactive network having exactly four energy storage elements, wherein an impedance magnitude at the output of the switch due to the reactive network has minima at dc and at a frequency near a second harmonic of the switching frequency.

16. The method claim 15, further including providing an impedance of the reactive network and loading by the rectifier to shape a voltage across the switch such that the frequency content dominantly comprises dc, the fundamental of the switching frequency, and the third harmonic of the switching frequency.

17. The method of claim 15, wherein an impedance of the reactive network and loading by the rectifier shape the switch voltage to provide substantially zero-voltage switching of the switch.

18. The method of claim 17, wherein the impedance of the reactive network and loading by the rectifier further shape the switch voltage to a quasi-trapezoidal waveform having a peak value of less than three times the dc input voltage during steady-state operation.

19. The method of claim 15, further including providing first and second dc input terminals, wherein switch includes first and second terminals, wherein the four energy storage elements includes first, second third, and fourth energy storage elements, wherein the first energy storage element is a first capacitance coupled between the first and second switch terminals, the second energy storage element is a first inductor having a first end connected to the first dc input terminal and a second end coupled to the switch first terminal, a direct connection from the second dc input terminal to the switch second terminal, a series connection of a second inductor corresponding to the third energy storage element and a second capacitor corresponding to the fourth energy storage element having a first end connected to the switch first terminal and a second end connected to the switch second terminal, wherein the series connection of the second inductor and the second capacitor is resonant near the second harmonic of the dc-dc converter switching frequency.

20. The method of claim 19, further including providing first and second dc output terminals, a rectifying device having a first and second terminal where the second terminal is connected to the first dc output terminal, a third inductor corresponding to a fifth energy storage element having a first terminal connected to the switch first terminal and a second terminal connected to the rectifying device first terminal, a third capacitor corresponding to a sixth energy storage element having a first terminal connected to the rectifying device first terminal and a second terminal connected to the switch second terminal, a direct connection from the switch second terminal to the second dc output terminal.

21. The method of claim 15, wherein the converter provides a path for dc current from the converter input to the converter output and delivers a fraction of the total converted power at dc.

22. The method of claim 15, wherein the first capacitance is composed entirely of the switch parasitic capacitance.

23. A dc-dc converter comprising:
   a rectifier; and
   a resonant inverter coupled to the rectifier, the resonant inverter including:
   a switch activated at a fixed switching frequency and a fixed duty ratio across a range of output powers; and
   a reactive network for providing near zero-voltage switching turn on of said switch, said reactive network having two zeros and two poles, wherein a first one of the two zeros is at dc and a second one of the two zeros is located in relation to the second harmonic of said switching frequency.

24. The dc-dc converter of claim 23, wherein control of the average converter output is obtained by on/off control of the converter.

25. The dc-dc converter of claim 23, wherein a first one of the two poles is located in relation to the switching frequency and a second one of the two poles is located in relation to the third harmonic of the switching frequency.

* * * * *